United States Patent
Bayus et al.

(10) Patent No.: US 7,200,659 B2
(45) Date of Patent: Apr. 3, 2007

(54) LOG-IN RESOURCE RELEASE SYSTEM

(75) Inventors: Mark S. Bayus, Tucson, AZ (US);
James C. Chen, Tucson, AZ (US);
Steven E. Klein, Tucson, AZ (US);
Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 11/031,848

(22) Filed: Jan. 7, 2005

(65) Prior Publication Data

US 2006/0155844 A1 Jul. 13, 2006

(51) Int. Cl.
*G06F 15/173* (2006.01)
(52) U.S. Cl. .................. 709/224; 711/163; 709/225; 709/226
(58) Field of Classification Search ........ 709/224–227; 711/163
See application file for complete search history.

(56) References Cited

U.S. PATENT DOCUMENTS 7,117,276 B2 * 10/2006 Maeda et al. ................ 710/36

* cited by examiner

*Primary Examiner*—Walter D. Griffin
*Assistant Examiner*—Ryan Bertram
(74) *Attorney, Agent, or Firm*—Quarles & Brady Streich Lang LLP

(57) ABSTRACT

A log-in resource release system includes a set of lists for managing log-in requests to a processing cluster input/output port from host server input/output ports. Host servers that have been granted memory structures within a memory storage device ("configured hosts") are granted priority access to a storage processing device's input/output port ("cluster port"). If the cluster port has exhausted its log-in resources, log-on requests from non-configured hosts will be not be accepted. New log-in requests from configured hosts will cause a host connected at a link or transport layer but not an upper layer to be logged off. If no hosts are connected only at the link or transport layer, a non-configured host connected at an upper layer will be logged off. If only configured hosts are connected and only at the upper layer, the log-on request by the configured host will be denied.

18 Claims, 2 Drawing Sheets

Resource Release Algorithm

LOG-IN RESOURCE RELEASE SYSTEM

BACKGROUND OF THE INVENTION

1. Field of the Invention

This invention is related in general to the field of data storage systems. In particular, the invention consists of a system for releasing log-in port resources.

2. Description of the Prior Art

Complex digital data storage systems typically include a high-capacity disk array, such as a redundant array of inexpensive/independent disks ("RAID"), for storing information. These data storage systems may utilize one or more data storage servers consisting of multiple processing clusters ("cluster") to allow a plurality of host servers ("hosts") access to the disk array. These hosts typically include input/ouput ("I/O") adapters for communicating with other I/O adapters located at the clusters. Information may be transported over a Fibre channel transport layer, sometimes referred to as a fabric.

Two protocols used to communicate over the transport layer are Fibre Channel Protocol ("FCP") and Fibre Connectivity ("FICON"). Each I/O adapter located at a host may be configured as either an FCP or FICON port. Typically, each port is allowed to access each other port connected to the fabric. However, zoning may be implemented on the fabric to segregate ports into sets, limiting which ports are allowed access to each other. Limiting which cluster I/O ports that a host port may access is referred to as fabric zoning.

A host port logs-in to a cluster by requesting log-in resources from a controller. The log-in resources typically include an area of memory within a memory device, such as a random access memory ("RAM"), for storing information about the host port. A log-in may occur at one or more level of the host's communication protocol. Low layer connections may include physical, data link, network, and transport layer connections as defined by the Organization for Standardization ("ISO") in the OSI model. Upper layer connections may include application, presentation, or session layers. However, these layers may be considered either low layer or upper layer connections, depending on the needs of the user. A link-layer or transport layer log-in ("PLOGI") may occur using either FCP or FICON. An explicit upper layer log-in using FICON is referred to as Establish Logical Path ("ELP"), while an explicit upper layer log-in using FCP is referred to as a Process Login ("PRLI"). Once logged-in, a host may request structured memory space within the RAID from the cluster. If the cluster grants the request, the host is deemed to be configured.

A problem may occur if a data storage server is on a fabric that is not configured to use zoning. Without zoning, numerous log-in requests to the same cluster may result in exhaustion of the clusters log-in resources, preventing other hosts from being able to log-in. While some hosts may be able to log into other clusters, a configured host will lose access to its structured memory if denied access to its granting cluster. Accordingly, it is desirable to have a system for releasing log-in port resources so that a configured host may log-in to its granting cluster so as to maintain access to its structured memory.

One solution is to temporarily take the cluster port off-line. While taking the cluster port off-line, any hosts logged-in to the cluster may be logged-off. Another solution is to manually disconnect the cluster port from the fabric. In this scenario, all hosts currently logged-in to the cluster will be disconnected without notification. Either way, the hosts lose access to the disk array through the cluster. Additionally, under fibre channel protocols, all tasks in progress during log-off are terminated. Once the cluster port is brought back online or reconnected, each host will have to log-in again. However, the problem will re-occur if all configured hosts do not log-in before the cluster log-in resources are exhausted again. Accordingly, it is desirable to free up cluster log-in resources without taking the cluster port offline or physically disconnecting it.

SUMMARY OF THE INVENTION

The invention disclosed herein utilizes a set of lists implemented by a processing cluster's controller to manage access to a cluster's input/output port ("cluster port"). Host ports requesting access to the cluster port are identified as either configured or non-configured ports. A log-in process begins with a host port establishing a link-layer connection with the cluster port. Once logged-in at the link-layer, the host port is placed on an initial log-on list. If the host port establishes an upper-layer connection with the cluster port, the host port is moved from the initial log-on list to one of two other lists, e.g., an intermediary list and a high-priority list. Configured host ports transition from the initial log-on list to the high-priority list while non-configured hosts are moved to the intermediary list. If a host port terminates its upper-layer connection but maintains its link-layer connection, it is moved from either the intermediary list or high-priority list back to the initial log-on list. If a host port logs-off from its link-layer connection, it is removed from all lists.

If a cluster's log-in resources are exhausted when a configured host port attempts to log-in, the cluster port will implement a log-in port release algorithm. If any host ports are on the initial log-in list, the oldest entry will be removed to make room for the incoming configured host port. If the initial log-in list is empty, the algorithm advances to the intermediary list. If any host ports are on the intermediary list, the oldest entry will be logged off. However, if no host ports are listed in either of the first two lists and the cluster log-in resources are still exhausted, then the incoming configured host port will be denied access to the cluster.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of implementing a set of lists to manage host port access to a cluster port. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays ("FPGAs"), application-specific integrated circuits ("ASICs"), complex programmable logic devices ("CPLDs"), programmable logic arrays ("PLAs"), microprocessors, or other similar processing devices.

Figure 1:
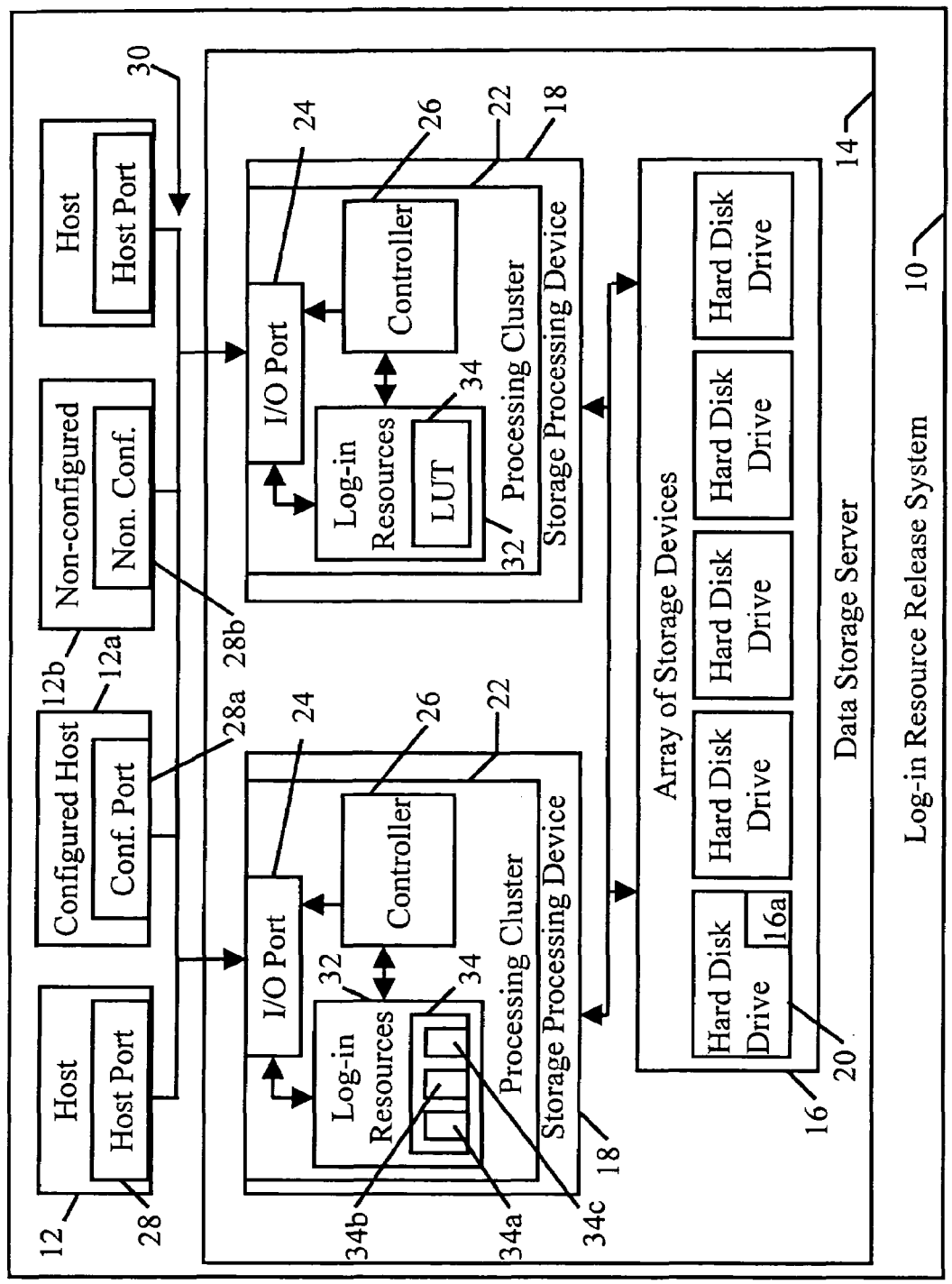
FIG. 1 is a block diagram illustrating a log-in resource release system including a plurality of host servers and a data storage server including a memory storage device and one or more processing clusters.

Referring to figures, wherein like parts are designated with the same reference numerals and symbols, FIG. 1 is a block diagram illustrating a log-in resource release system 10 including a plurality of host servers ("hosts") 12 and a data storage server 14 including a memory storage device 16 and one or more storage processing devices 18. In this embodiment of the invention, the memory storage device 16 is a redundant array of inexpensive/independent disks ("RAID") composed of a collection of hard-disk drives 20. Alternatively, the memory storage device 16 may include one or more magneto-optical drives, floppy-disk drive, magnetic tape cartridge, or other form of memory device.

The storage processing device 18 includes a processing cluster 22 with an adapter configured as a cluster input/output port ("cluster port") 24. The cluster port is managed by a controller 26 such as a microprocessor or programmable logic device ("PLD"). Each host 12 include a host input/output ports ("host port") 28. In this embodiment of the invention, each host port is configured according to the fibre connectivity ("FICON") communication protocol or the fibre channel protocol ("FCP"). A network 30 connects the host ports 28 to the cluster ports 24.

A log-in resource device 32, such as a flash memory chip or random access memory ("RAM"), maintains information about each host port 28 logged-in to its associated cluster 22. According to the invention, the log-in resource device 32 includes a data structure 34 for managing host port 28 access to the cluster port 24. The data structure includes lists 34a,34b,34c and may be implemented as a look-up table. Additionally, the log-in resource device 32 maintains information about the configuration status of various host ports 28. If a host 12a has requested a memory structure 16a within the memory storage device 16, and that request has been granted by the controller 26, the log-in resource device 32 identifies the associated host port as a configured host port 28a. If a memory structure 16a has not been granted to a host 12b, its associated host port is identified by the log-in resource device 32 as a non-configured host port 28b.

If a host port creates a link-layer connection with a cluster port 24, the host port 28 is placed on the initiation list 34a. If an upper-layer connection is subsequently created between the host port 28 and the cluster port 24, the host port 28 is transferred to either the intermediary list 34b or the priority list 34c depending on its configuration status. If the host port that creates the upper-layer connection is identified by the log-in resource device 32 as a configured host port 28a, it is moved to the priority list 34c. Otherwise, the non-configured host port 28b is moved to the intermediary list 34b.

Figure 2:
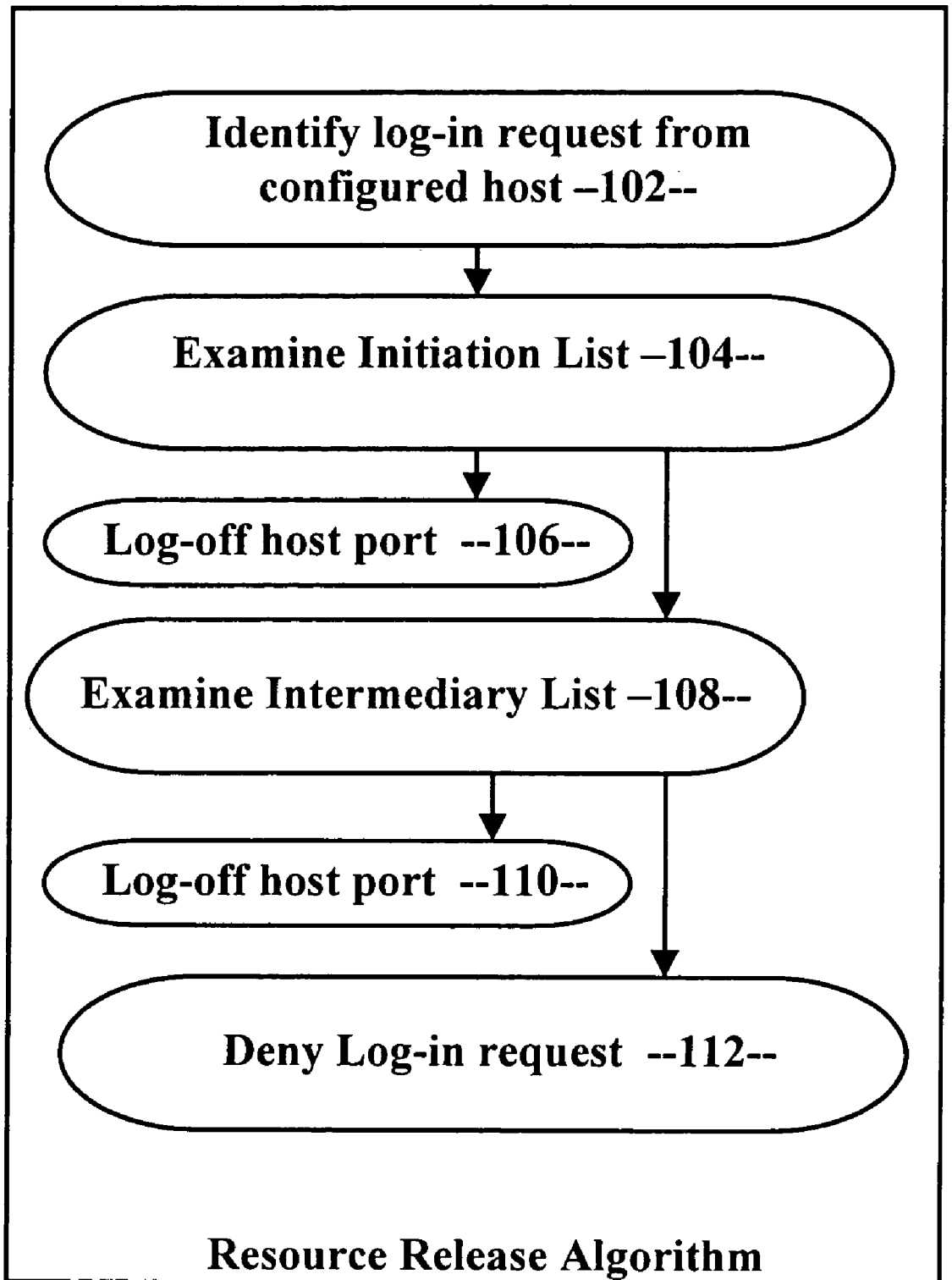
FIG. 2 is a flow chart illustrating a resource release algorithm implementing a process of releasing log-in port resources.

If the log-in resource device has exhausted its capacity for accepting log-ins, existing log-ins must be terminated before new connections can be created between host ports 28 and the cluster port 24. Accordingly, FIG. 2 is a flow chart illustrating a log-in port release algorithm 100. In step 102, the controller 26 identifies a log-in request. In step 104, the controller examines the initiation list 34a to see if any host ports 28 have been registered as connected only at the link-layer. If so, the controller logs-off one of the host ports that are identified on the initiation list 34a in step 106. In this embodiment of the invention, the oldest entry on the list 34a is logged-off. However, other resource allocation algorithms may be implemented to determine which host port 28 should be logged-off.

If no entries are found on the initiation list 34a, the controller 26 examines the intermediary list 34b in step 108 to determine if any non-configured host ports 28b have connected at both the link-layer and upper layer. If so, a resource allocation algorithm is used to determine which non-configured host port 28b should be logged-off in step 110. If no host ports exist on either the initiation list 34a or the intermediary list 34b, access to the cluster port 24 is denied in step 112.

Those skilled in the art of making log-in resource release systems may develop other embodiments of the present invention. However, the terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A log-in resource release system, comprising:
   a first host server including a first host port generating a log-in request; and
   a processing cluster, said processing cluster comprising a cluster port connected to the host port through a network, a log-in resource device including a capacity for storing information pertaining to logged-in host ports and an initiation list for indicating a plurality of host ports logged-in to the cluster port through a low layer connection;
   wherein, if the capacity for storing information is exhausted, a controller is adapted to examine the initiation list, and to terminate a first log-in from a second host port if the second host port is included in the initiation list.

2. The log-in resource release system of claim 1, wherein the log-in resource device further includes an intermediary list for indicating a plurality of non-configured host ports logged-in to the cluster port through an upper layer connection, and the controller is further adapted to examine the intermediary list and to terminate the first log-in from the second host port if the second host port is not included in the initiation list but is included in the intermediary list.

3. The log-in resource release system of claim 2, wherein the log-in resource device is a memory device.

4. The log-in resource release system of claim 2, wherein the low layer connection is a link layer of a communication protocol.

5. The log-in resource release system of claim 2, wherein the low layer connection is a transport layer of a communication protocol.

6. The log-in resource release system of claim 2, wherein the controller is adapted to identify the first host port as including a configured host port and to place the first host port on the intermediary list.

7. A method of releasing a part of a log-in resource, comprising the steps of:
   generating a log-in request to a cluster port of a processing cluster from a first host port;

identifying that a capacity of the log-in resource to store information pertaining to logged-in host ports is exhausted;

examining an initiation list indicating a plurality of host ports logged-in to the cluster port through a low layer connection but not through an upper layer connection; and terminating a first log-in from a second host port if the second host port is included in the initiation list.

8. The method of claim 7, further comprising the steps of:

examining an intermediary list indicating a plurality of non-configured host ports logged-in to the cluster port through an upper layer connection; and terminating the first log-in from the second host port if the second host port is not included in the initiation list but is included in the intermediary list.

9. The method of claim 8, wherein the log-in resource is a memory device.

10. The method of claim 8, wherein the low layer connection is a link layer of a communication protocol.

11. The method of claim 8, wherein the low layer connection is a transport layer of a communication protocol.

12. The method of claim 8, further comprising the steps of:

identifying the first host port as including a configured host port; and placing the first host port on the intermediary list.

13. An article of manufacture including a data storage medium, said data storage medium including a set of machine-readable instructions that are executable by a processing device to implement an algorithm, said algorithm comprising the steps of:

generating a log-in request to a cluster port of a processing cluster from a first host port;

identifying that a capacity of the log-in resource to store information pertaining to logged-in host ports is exhausted;

examining an initiation list indicating a plurality of host ports logged-in to the cluster port through a low layer connection but not through an upper layer connection; and terminating a first log-in from a second host port if the second host port is included in the initiation list.

14. The article of manufacture of claim 13, further comprising the steps of:

examining an intermediary list indicating a plurality of non-configured host ports logged-in to the cluster port through an upper layer connection; and terminating the first log-in from the second host port if the second host port is not included in the initiation list but is included in the intermediary list.

15. The article of manufacture of claim 14, wherein the log-in resource is a memory device.

16. The article of manufacture of claim 14, wherein the low layer connection is a link layer of a communication protocol.

17. The article of manufacture of claim 14, wherein the low layer connection is a transport layer of a communication protocol.

18. The article of manufacture of claim 14, further comprising the steps of:

identifying the first host port as including a configured host port; and placing the first host port on the intermediary list.

* * * * *